Patented Jan. 19, 1937

2,067,911

UNITED STATES PATENT OFFICE 2,067,911

PROCESS OF MAKING LEAVENED BREAD

Charles N. Frey, Alfred S. Schultz, and Elmer B. Brown, New York, N. Y., assignors, by mesne assignments, to Standard Brands Incorporated, Dover, Del., a corporation of Delaware No Drawing. Application November 3, 1927, Serial No. 230,924

12 Claims. (Cl. 99—91)

This invention relates to improvements in the manufacture of yeast leavened bread, and more particularly to novel compositions of the type commonly known as bread improvers and methods of using the same.

An object of the invention is to provide a composition which may be economically and easily prepared and used, which will not deteriorate under commercial conditions of shipment and storage, and which, when used in the manufacture of bread, will allow of the reduction of the cost of ingredients, while at the same time improving the general characteristics, and particularly the crust color and interior color, of the bread.

A more specific object of the invention is to provide a composition of the type described which, when used in bread manufacture, improves the crust color or "bloom" of the loaf to an extent such as to allow of the use of sugar substances such as corn sugar, maltose and the like.

Another object of the invention is to provide novel processes of manufacturing yeast leavened bread having improved quality.

Other objects of the invention will in part be obvious and will in part appear hereinafter.

The invention accordingly comprises the several steps and the relation and order of one or more of such steps with respect to each of the others, and the composition of matter possessing the features, properties, and the relation of constituents, which are exemplified in the following detailed disclosure, and the scope of the application of which will be indicated in the claims.

Heretofore in the manufacture of yeast leavened bread, it has been customary to use as the sugar material in the dough mix either cane sugar or malt extract. With these sugar materials it has been found that a sufficient depth of crust color is generally obtainable, whereas, when the use of certain other sugar substances, such as corn sugar and pure maltose sugars, has been attempted, the loaf produced is substantially devoid of crust color.

In accordance with the principles of the present invention it is found, however, that substances of the last-mentioned type can be used successfully if there is added to the bread-dough mix a substance which is adapted to release ammonia (NH$_3$) during the manufacture, and particularly during the baking step. Although we do not wish to be bound by theory, all of our observations seem to indicate that the ammonia thus released aids in the oxidation of the hexose sugars, and has other effects which tend to produce good crust color.

A substance which has been found to produce this effect efficiently is urea. The amounts necessary to be used will vary somewhat in accordance with the flour and the other dough ingredients, but, in general, it might be stated that for 300 lbs. of flour about 0.5 lb. of urea will be sufficient to produce a loaf of excellent crust color when using corn sugar or pure maltose as the sugar material in any usual bread-dough mix.

It is also found that the amount of urea necessary to be used can be decreased, as, for example, to from 0.2 to 0.25 lb. if the enzyme urease (a convenient source being soy bean) is also added to the bread-dough mix. Apparently the urease acts upon the urea to facilitate the release of ammonia therefrom. A suitable amount of urease expressed as ground soy bean, is from 0.2 to 0.25 lb. in the above formula.

Since the release of ammonia in a bread-dough batch, even in minute amounts, tends to affect the hydrogen-ion concentration of the mix, it is preferred also to add to the bread-dough mix a small amount of a relatively insoluble acid substance having a distinct acidity. A relatively insoluble acid substance is preferred for the reason that it is not desired that the acid should immediately combine with all of the free ammonia. A substance which has been found to be particularly adapted for this purpose is mucic acid. When using mucic acid alone, about 0.25 lb. will be sufficient for a mix including 300 lbs. of flour and 0.5 lb. of urea, as above mentioned. In place of at least a portion of the mucic acid, other relatively insoluble acid substances can be used, such, as, for example, acid phosphate $CaH_4(PO_4)_2$, in which case the mucic acid and acid phosphate may each be present to the amount of about 0.1 lb.

For purposes of convenience and accuracy in weighing, the urea, urease and mucic acid may be uniformly distributed in a filler material, such as flour, starch, cornstarch or the like, and as indicated above, a portion of the filler may be composed of ground soy bean, which of itself will furnish sufficient urease to produce the results desired.

Since certain changes may be made in the above processes and composition of matter and different embodiments of the invention could be made without departing from its scope, it is intended that all matter contained in the above description shall be interpreted as illustrative and not in a limiting sense.

It is also to be understood that the following claims are intended to cover all of the generic and specific features of the invention herein described and all statements of the scope of the invention which as a matter of language might be said to fall therebetween.

Having described our invention, what we claim as new and desire to secure by Letters Patent is:

1. A process of manufacturing yeast leavened bread, which comprises mixing with the flour, yeast and other dough ingredients a small quantity of urea and a relatively insoluble acid substance having a distinct acidity.

2. A process of manufacturing yeast leavened bread, which comprises mixing with the flour, yeast and other dough ingredients up to about 0.5 lb. of urea and 0.25 lb. of mucic acid per 300 lbs. of flour.

3. A process of manufacturing yeast leavened bread, which comprises mixing with the flour, yeast and other dough ingredients up to about 0.5 lb. of urea, about 0.1 lb. of mucic acid and about 0.1 lb. of acid phosphate per 300 lbs. of flour.

4. A process of manufacturing yeast leavened bread, which comprises mixing with the flour, yeast and other dough ingredients about 0.3 lb. of urea, and 0.25 lb. each of urease expressed as soy bean and mucic acid per 300 lbs. of flour.

5. A process of making yeast leavened bread of normal crust color, which includes using a sugar material normally giving insufficient crust color and producing a normal crust color by admixing with said sugar material, flour, yeast and other dough ingredients a small quantity each of urea and mucic acid.

6. A process of making yeast leavened bread of normal crust color, which includes using a sugar material normally giving insufficient crust color and producing a normal crust color by admixing with said sugar material, flour, yeast and other dough ingredients a small quantity each of urea, urease and mucic acid.

7. A process of making yeast leavened bread of normal crust color, which includes using a sugar material normally giving insufficient crust color and producing a normal crust color by admixing with said sugar material, flour, yeast and other dough ingredients a small quantity each of urea, urease, mucic acid and acid phosphate.

8. A process of manufacturing yeast leavened bread, which comprises mixing with the flour, yeast and other dough ingredients a small quantity each of urea, a material containing the enzyme urease, and a relatively insoluble acid substance having a distinct acidity.

9. A new composition of matter for use associated with yeast in the making of yeast leavened bread, comprising the following ingredients in substantially the following proportions; 0.3 part of urea and 0.25 part each of urease, expressed as ground soy bean, and mucic acid.

10. A new composition of matter for use associated with yeast in the making of leavened bread, comprising the following ingredients in substantially the following proportions; 0.3 part of urea and 0.25 part each of urease, expressed as ground soy bean, and a relatively insoluble acid substance having a distinct acidity.

11. A new composition of matter adapted for use associated with yeast in the making of yeast leavened bread, which comprises urea, a material containing the enzyme urease, and a relatively insoluble acid substance having a distinct acidity.

12. A new composition of matter adapted for use in the making of yeast leavened bread, including flour, yeast and other dough ingredients, urea, and a relatively insoluble acid substance having a distinct acidity.

CHARLES N. FREY.
ALFRED S. SCHULTZ.
ELMER B. BROWN.